(12) United States Patent
May et al.

(10) Patent No.: US 8,145,200 B2
(45) Date of Patent: *Mar. 27, 2012

(54) METHOD AND APPARATUS FOR CONFIGURING UNIQUE PROFILE SETTINGS FOR MULTIPLE SERVICES

(75) Inventors: Darrell R. May, Waterloo (CA); Andrew Bocking, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1432 days.

This patent is subject to a terminal disclaimer.

(21) Appl. No.: 11/616,930

(22) Filed: Dec. 28, 2006

(65) Prior Publication Data

US 2008/0043958 A1    Feb. 21, 2008

Related U.S. Application Data

(63) Continuation-in-part of application No. 11/495,779, filed on Jul. 31, 2006.

(51) Int. Cl.
*H04M 3/00* (2006.01)
*H04M 1/663* (2006.01)

(52) U.S. Cl. .......... 455/419; 455/412.2; 455/414.3; 455/556.2; 455/567

(58) Field of Classification Search .......... 455/433, 455/414.3, 435.3, 456.2, 420, 432.3, 419, 455/412.2, 556.2, 567
See application file for complete search history.

(56) References Cited

U.S. PATENT DOCUMENTS

| | | | |
|---|---|---|---|
| 5,261,045 A | 11/1993 | Scully et al. | |
| 5,903,845 A | 5/1999 | Buhrmann et al. | |
| 5,973,612 A | 10/1999 | Deo et al. | |
| 6,119,001 A * | 9/2000 | Delis et al. | 455/433 |
| 6,208,996 B1 | 3/2001 | Ben-Shachar et al. | |
| 6,393,272 B1 | 5/2002 | Cannon et al. | |
| 6,418,309 B1 | 7/2002 | Moon et al. | |
| 6,457,062 B1 | 9/2002 | Pivowar et al. | |
| 6,603,969 B1 * | 8/2003 | Vuoristo et al. | 455/433 |
| 6,604,079 B1 | 8/2003 | Ruvolo et al. | |
| 6,633,758 B1 | 10/2003 | Heinonen et al. | |

(Continued)

FOREIGN PATENT DOCUMENTS

EP    0399520    11/1996

(Continued)

OTHER PUBLICATIONS

Olaf Drogehorn, et al. "Personalised Applications on Services for a Mobile User", Autonomous Decentralized Systems, 2005, ISADS 2005, Proceedings, [Online] Apr. 4, 2005, pp. 473-479, XP002419282.

(Continued)

*Primary Examiner* — Lisa Hashem
(74) *Attorney, Agent, or Firm* — Perry + Currier Inc.

(57) ABSTRACT

An apparatus and method are provided for configuring unique profile settings for multiple services associated with an application in an electronic device. A profile system is provided having multiple programmable profile settings and a default profile setting for the application. Service records are received at the electronic device for each of the multiple services. The multiple services register with the profile system using a unique ID for each of the service records and include data for identifying the default profile setting for the application. Initially, the default profile setting is assigned to each of the multiple services. Subsequently, the multiple programmable profile settings are assigned to respective ones of the multiple services.

13 Claims, 10 Drawing Sheets

U.S. PATENT DOCUMENTS

| | | | |
|---|---|---|---|
| 6,662,012 B1* | 12/2003 | Do | 455/433 |
| 6,731,932 B1 | 5/2004 | Rune et al. | |
| 6,785,868 B1 | 8/2004 | Raff | |
| 6,928,300 B1 | 8/2005 | Skinner et al. | |
| 6,990,333 B2 | 1/2006 | Andrew et al. | |
| 6,999,731 B2 | 2/2006 | Cronin | |
| 7,076,275 B1 | 7/2006 | Karstens et al. | |
| 7,092,925 B2 | 8/2006 | Na et al. | |
| 7,181,689 B2 | 2/2007 | Mock et al. | |
| 7,184,786 B2 | 2/2007 | Mumick et al. | |
| 7,243,130 B2 | 7/2007 | Horvitz et al. | |
| 7,248,900 B2 | 7/2007 | Deeds | |
| 7,263,353 B2* | 8/2007 | Forsberg et al. | 455/420 |
| 7,283,831 B2 | 10/2007 | Caldini et al. | |
| 7,797,679 B2* | 9/2010 | Tysowski et al. | 717/121 |
| 7,869,799 B2* | 1/2011 | Adams et al. | 455/417 |
| 7,873,646 B2* | 1/2011 | Yach et al. | 707/758 |
| 2002/0032040 A1 | 3/2002 | Tsukamoto | |
| 2002/0087573 A1 | 7/2002 | Reuning et al. | |
| 2002/0115429 A1 | 8/2002 | Deluca et al. | |
| 2002/0116541 A1 | 8/2002 | Parker et al. | |
| 2002/0136368 A1 | 9/2002 | Aoki et al. | |
| 2002/0142792 A1 | 10/2002 | Martinez | |
| 2002/0165969 A1 | 11/2002 | Gallant | |
| 2003/0043765 A1 | 3/2003 | Dawidowsky et al. | |
| 2003/0050982 A1 | 3/2003 | Chang | |
| 2003/0064746 A1 | 4/2003 | Rader et al. | |
| 2003/0131023 A1 | 7/2003 | Bassett et al. | |
| 2003/0143954 A1 | 7/2003 | Dettinger et al. | |
| 2003/0153368 A1 | 8/2003 | Bussan et al. | |
| 2003/0176188 A1 | 9/2003 | O'Neill | |
| 2003/0214775 A1* | 11/2003 | Fukuta et al. | 361/220 |
| 2004/0058718 A1 | 3/2004 | Yu | |
| 2004/0082317 A1 | 4/2004 | Graefen | |
| 2004/0086094 A1 | 5/2004 | Bosik et al. | |
| 2004/0127203 A1 | 7/2004 | Markki et al. | |
| 2004/0198427 A1 | 10/2004 | Kimbell et al. | |
| 2004/0203643 A1 | 10/2004 | Bhogal et al. | |
| 2004/0203644 A1 | 10/2004 | Anders et al. | |
| 2004/0203768 A1* | 10/2004 | Ylitalo et al. | 455/435.1 |
| 2004/0259535 A1* | 12/2004 | Elsey et al. | 455/414.3 |
| 2004/0268270 A1 | 12/2004 | Hill et al. | |
| 2005/0009547 A1 | 1/2005 | Harris et al. | |
| 2005/0079863 A1 | 4/2005 | Macaluso | |
| 2005/0080862 A1 | 4/2005 | Kent | |
| 2005/0085220 A1* | 4/2005 | Benco et al. | 455/414.1 |
| 2005/0096048 A1* | 5/2005 | Clare et al. | 455/433 |
| 2005/0136903 A1 | 6/2005 | Kashima et al. | |
| 2005/0164704 A1 | 7/2005 | Winsor | |
| 2005/0176410 A1* | 8/2005 | Brooking et al. | 455/412.1 |
| 2005/0180362 A1 | 8/2005 | Chin et al. | |
| 2005/0260989 A1* | 11/2005 | Pourtier et al. | 455/435.3 |
| 2005/0289202 A1 | 12/2005 | S et al. | |
| 2006/0020804 A1 | 1/2006 | Schleifer et al. | |
| 2006/0030315 A1* | 2/2006 | Smith et al. | 455/432.3 |
| 2006/0099945 A1* | 5/2006 | Helvick | 455/432.3 |
| 2006/0112427 A1 | 5/2006 | Shahbazi | |
| 2006/0143298 A1 | 6/2006 | Anttila | |
| 2006/0190547 A1 | 8/2006 | Bhogal et al. | |
| 2006/0223528 A1* | 10/2006 | Smith | 455/432.3 |
| 2007/0016646 A1 | 1/2007 | Tendjoukian et al. | |
| 2007/0032225 A1 | 2/2007 | Konicek et al. | |
| 2007/0061712 A1 | 3/2007 | Bodin et al. | |
| 2007/0099599 A1* | 5/2007 | Smith et al. | 455/414.1 |
| 2007/0184858 A1 | 8/2007 | Landschaft et al. | |
| 2007/0239843 A1* | 10/2007 | Knowles et al. | 709/217 |
| 2007/0275767 A1 | 11/2007 | Steele | |
| 2008/0200154 A1* | 8/2008 | Maharajh et al. | 455/414.3 |
| 2008/0254785 A1* | 10/2008 | Lazaridis et al. | 455/419 |
| 2008/0307323 A1 | 12/2008 | Coffman et al. | |
| 2009/0247189 A1* | 10/2009 | Sennett et al. | 455/456.2 |
| 2009/0270068 A1* | 10/2009 | Ahopelto et al. | 455/406 |
| 2010/0222043 A1* | 9/2010 | Dragt | 455/414.3 |
| 2010/0287533 A1* | 11/2010 | Tysowski et al. | 717/121 |
| 2010/0291924 A1* | 11/2010 | Antrim et al. | 455/433 |
| 2010/0304732 A1* | 12/2010 | Ward | 455/420 |
| 2010/0311404 A1* | 12/2010 | Shi et al. | 455/419 |

FOREIGN PATENT DOCUMENTS

| | | |
|---|---|---|
| EP | 1185058 A2 | 3/2002 |
| EP | 1217532 A2 | 6/2002 |
| EP | 1220521 A2 | 7/2002 |
| EP | 1259053 | 11/2002 |
| EP | 1569127 A1 | 8/2005 |
| EP | 1887463 A | 2/2008 |
| WO | 9747120 A | 12/1997 |
| WO | 9747120 A2 | 12/1997 |
| WO | 00/62201 A | 10/2000 |
| WO | 02/44958 A | 6/2002 |
| WO | 03/026259 A1 | 3/2003 |
| WO | 03/056791 | 7/2003 |
| WO | 2005/116892 A | 12/2005 |

OTHER PUBLICATIONS

European Search Report dated Sep. 11, 2008 of European Patent Application No. 07124062.6.

The Information Technology Department Presents Outlook Tips, vol. 2, Sep. 2002.

Intellectual Property Office of Singapore, Search Report dated Dec. 8, 2009.

Canadian Patent Application No. 2,615,313 Office Action dated Sep. 9, 2010.

Houssos et al, "Advanced adaptability and profile management framework for the support of flexible mobile service provision, IEEE Wireless communication" Aug. 2003.

* cited by examiner

300 — Normal
Browser
Calendar
302 — Level 1 Messages
Messages[Desktop]
304 — Messages[Email]
Messages[Web Client]
Messenger – Alert
306 — Messenger – New Message
MMS
Phone
SMS Text
Tasks

FIG. 12

302 — Messages[Desktop] in Normal

| | |
|---|---|
| Out of Holster: | None |
| Tune: | Notifier_Nymph |
| Volume: | Mute |
| Number of Beeps: | 1 |
| Repeat Notification: | LED Flashing |
| Number of Vibrations: | 2 |
| In Holster: | Vibrate |
| Tune: | Notifier_Nymph |
| Volume: | Mute |
| Number of Beeps: | 1 |
| Repeat Notification: | LED Flashing |
| Number of Vibrations: | 2 |
| Notify Me During Calls: | No |

METHOD AND APPARATUS FOR CONFIGURING UNIQUE PROFILE SETTINGS FOR MULTIPLE SERVICES

FIELD

The present application relates generally to electronic devices and more particularly to a method and apparatus for configuring unique profile settings for multiple services in connection with which an electronic device is provisioned.

BACKGROUND

Electronic devices such as wireless personal digital assistants (PDAs), smart telephones and laptop computers with wireless capabilities are well known for providing users with services such as e-mail, Web browsing, text messaging, etc. Such devices communicate over a wide variety of networks including data-only networks such as Mobitex and DataTAC as well as complex voice and data networks such as GSM/GPRS, CDMA, EDGE, UMTS and CDMA2000 networks.

It is known to provide multiple user-selectable profiles (e.g. loud, discreet, quiet, etc.) for notifying or alerting the user to service activity (e.g. incoming call or e-mail message, calendar event, daily alarm, etc.). On device start-up, each application (e.g. calendar, e-mail, phone, etc.) registers with a profile system using a unique ID, to facilitate programming of an individual profile setting for each application.

Some users may have multiple services that they wish to access through the device. For example, some users may wish to access multiple e-mail accounts, and other types of data services, all or some of which may be provided by different service providers.

Although it is known to select a profile for application to a particular service, it would be desirable to apply a unique profile setting to each of multiple services (e.g. a unique profile setting for each of a user's multiple e-mail accounts).

BRIEF DESCRIPTION OF THE DRAWINGS

FIGS. 8, 9 10, 11, 12 and 13 are screen shots of the electronic device.

DETAILED DESCRIPTION OF THE EMBODIMENT

Figure 1:
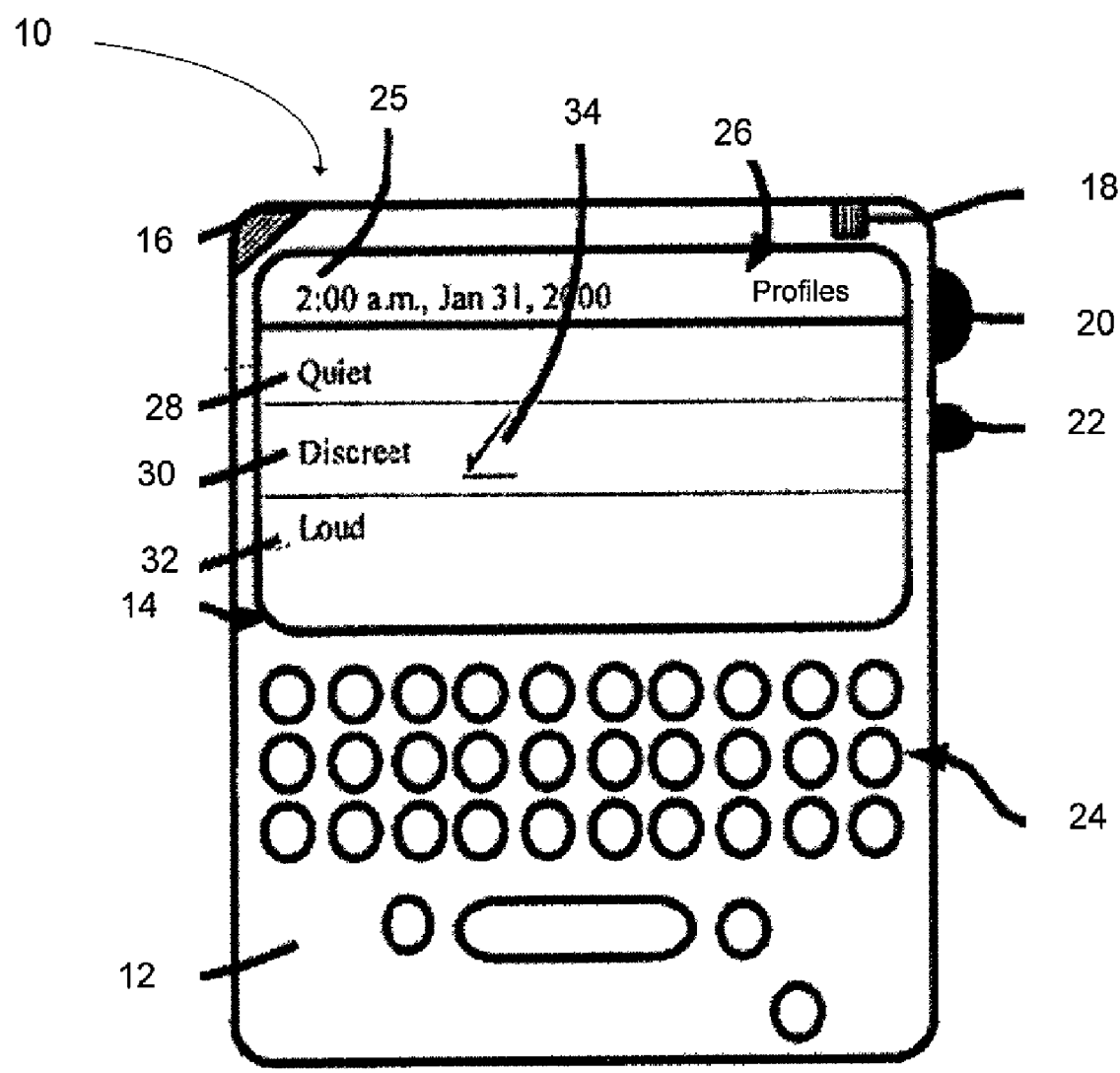
FIG. 1 is a schematic representation of a electronic device with a graphical user interface for programming profile settings for different applications.

According to one aspect there is provided a method for configuring a unique profile for a service associated with an application in an electronic device, including: providing a profile system having multiple programmable profile settings and a default profile setting for the application; receiving a service record for the service; registering the service with the profile system using the service record; configuring the multiple programmable profile settings using profile data retrieved from the service record to provide the unique profile; and identifying the unique profile using a name retrieved from the service record; wherein if the service record does not include profile data, the default profile setting is used for the service.

According to another aspect there is provided an apparatus for configuring unique profile settings for multiple services associated with an application in an electronic device, including: a profile system having multiple programmable profile settings and a default profile setting for the application; means for receiving service records for the multiple services; means for registering the multiple services with the profile system using a unique ID for each of the service records; and means for assigning unique profiles to each of the multiple services using data from the service records.

According to another aspect there is provided a portable electronic device including: an antenna and radio device for receiving service records for multiple services associated with an application of the portable electronic device, at least one of the service records including unique profile data and a name corresponding to the unique profile data; a profiles system in communication with the application, the profile system including multiple programmable profile settings and a default profile setting corresponding to the application; a processor for programming at least one of the multiple programmable profile settings based on the unique profile data from the at least one service record and assigning the at least one of the multiple programmable profile settings to a corresponding one of the multiple services, the default profile setting being assigned to others of the multiple programmable profile settings; and a display screen for displaying a list of the multiple services, the corresponding one of the multiple services being identified by the name.

By providing multiple unique profile settings for different services, the user may set a different ring tone, volume, etc., for each service (e.g. separate e-mail accounts) to which the user has subscribed.

According to an additional aspect, the ID associated with each service for registration with the profile system also identifies a default root profile setting that permits later registration with the profile system in circumstances where no service record for the service has yet been downloaded to the device. This facilitates migration of profile settings that have been programmed before Over-the-Air (OTA) device synchronization following a software upgrade, or after a system restore operation.

Figure 2:
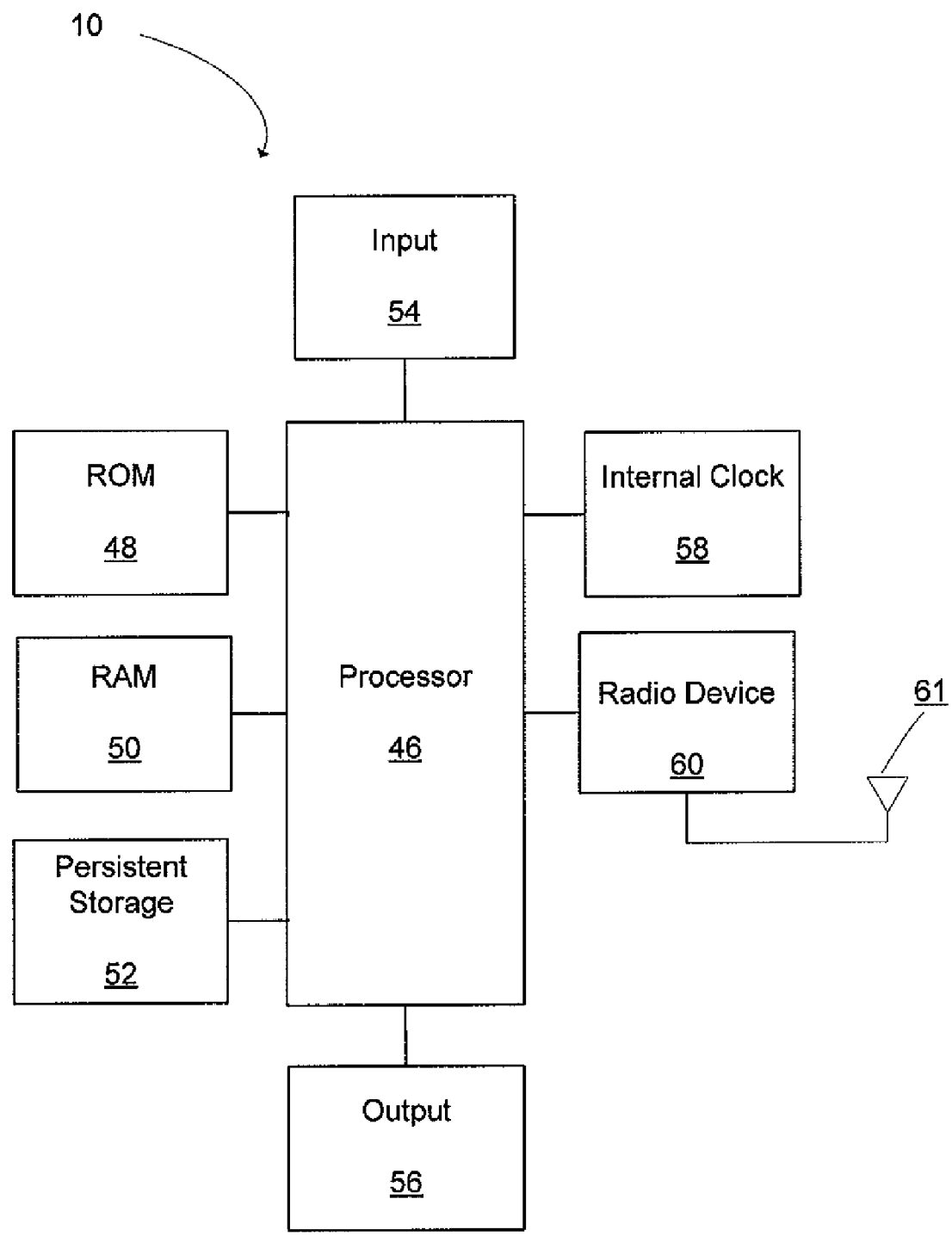
FIG. 2 is a block diagram of certain internal components within the electronic device of FIG. 1.

Reference is first made to FIG. 1, showing an electronic device 100 based on the computing environment and functionality of a wireless personal digital assistant. It is, however, to be understood that electronic device 10 can include the construction and functionality of other electronic devices, such as desktop computers, cell phones, smart telephones, and laptops with wireless 802.11 or bluebook chip sets and the like. In one embodiment, electronic device 10 includes a housing 12, which frames an LCD display 14, as well as a speaker 16, an LED indicator 18, a trackwheel 20, an exit key 22 and a key pad 24. Trackwheel 20 and exit key 22 can be inwardly depressed to provide additional user-input. In the illustrated embodiment, LCD display 14 depicts a system clock 25 and additional information, such as generated by a "Profiles" application 26, as discussed in greater detail below Turning briefly to FIG. 2, certain internal components within the electronic device 10 are illustrated by way of a block diagram. The electronic device 10 is based on a microcomputer that includes a processor 46 connected to a read-only-memory (ROM) 48 that contains a plurality of applications executable by the processor 46 to enable the electronic device 10 to provide certain services (e.g. calendar, e-mail, phone, etc.). The processor 46 is also connected to a random access memory (RAM) 50 and a persistent storage device 52, which is responsible for various non-volatile storage functions of the electronic device 10. The processor 46 receives input from input devices 54 such as key pad 24, trackwheel 20 and exit key 22 (FIG. 1). The processor 46 outputs to output devices 56 such as LCD display 14, LED indicator 18 and speaker 16 (FIG. 1). The processor 46 is also connected to an internal clock 58 and a radio device 60 which, in turn, is connected to an antenna 61. Together, the radio device 60 and the antenna 61 are used to communicate over a wireless network. As discussed in greater detail below with reference to FIG. 3, the electronic device 10 is operable to receive and transmit communication signals containing data that is communicated to and from a communication system via the radio device 60 and the antenna 61.

Returning to FIG. 1, LCD display 14 of electronic device 10 may be used to display different notification profiles using "Profiles" application 26. This allows the user to program customized notification or alerting profiles. A plurality of notification profiles is shown: Quiet 28, Discreet 30, and Loud 32. Each of these profiles can be customized by the manufacturer or by the user according to user preference, and can also be deleted or supplemented with additional profiles as desired. The following Table shows how each profile can be customized:

An Example of Customizing Methods of Notification

| Mode of Notification | Application | Notification Behaviour |
|---|---|---|
| Quiet | Message Reader | Type: Inaudible<br>Tune: None<br>Volume: Mute |
|  | Daily Alarm | Type: Audible<br>Tune: Ring 2<br>Volume: Low |
| Discreet | Message Reader | Type: Audible & Inaudible<br>Tune: Ring 3<br>Volume: Medium |
|  | Daily Alarm | Type: Audible<br>Tune: Ring 1<br>Volume: Low |
| Loud | Message Reader | Type: Audible<br>Tune: Ring 5<br>Volume: High |
|  | Daily Alarm | Type: Audible<br>Tune: Ring 6<br>Volume: High |

Checkmark 34, located beside the profile "Discreet", in FIG. 1, indicates that the default mode of notification for the present example is Discreet 30. Trackwheel 20 can be used to scroll through the different profiles and to select a particular profile for each application (e.g. message reader (email), daily alarm, calendar, etc.).

As illustrated in the foregoing Table, each profile can give rise to a different notification output for various applications on device 10, and notification behavior can be customized according to a variety of criteria, such as "type", "tune" and "volume". "Type" can be either audible or inaudible. Audible means a sound emanating from speaker 16 and inaudible means a light flashing from LED indicator 18. "Tune" can be any tune chosen by the manufacturer or the user and programmed into device 10. This is the tune that would be played by speaker 16 when "type" is set to audible. "Volume" determines the volume of the tune and in the present embodiment can be low, medium or high.

It will be apparent to those skilled in the art that the foregoing Table is just one example of the way in which notifications can be customized. Furthermore, the specific types, tunes and volumes outlined in this Table are not particularly limited. Also the list of specific applications associated with each mode is not particularly limited and can match the complete set of applications on device 10.

Figure 3:
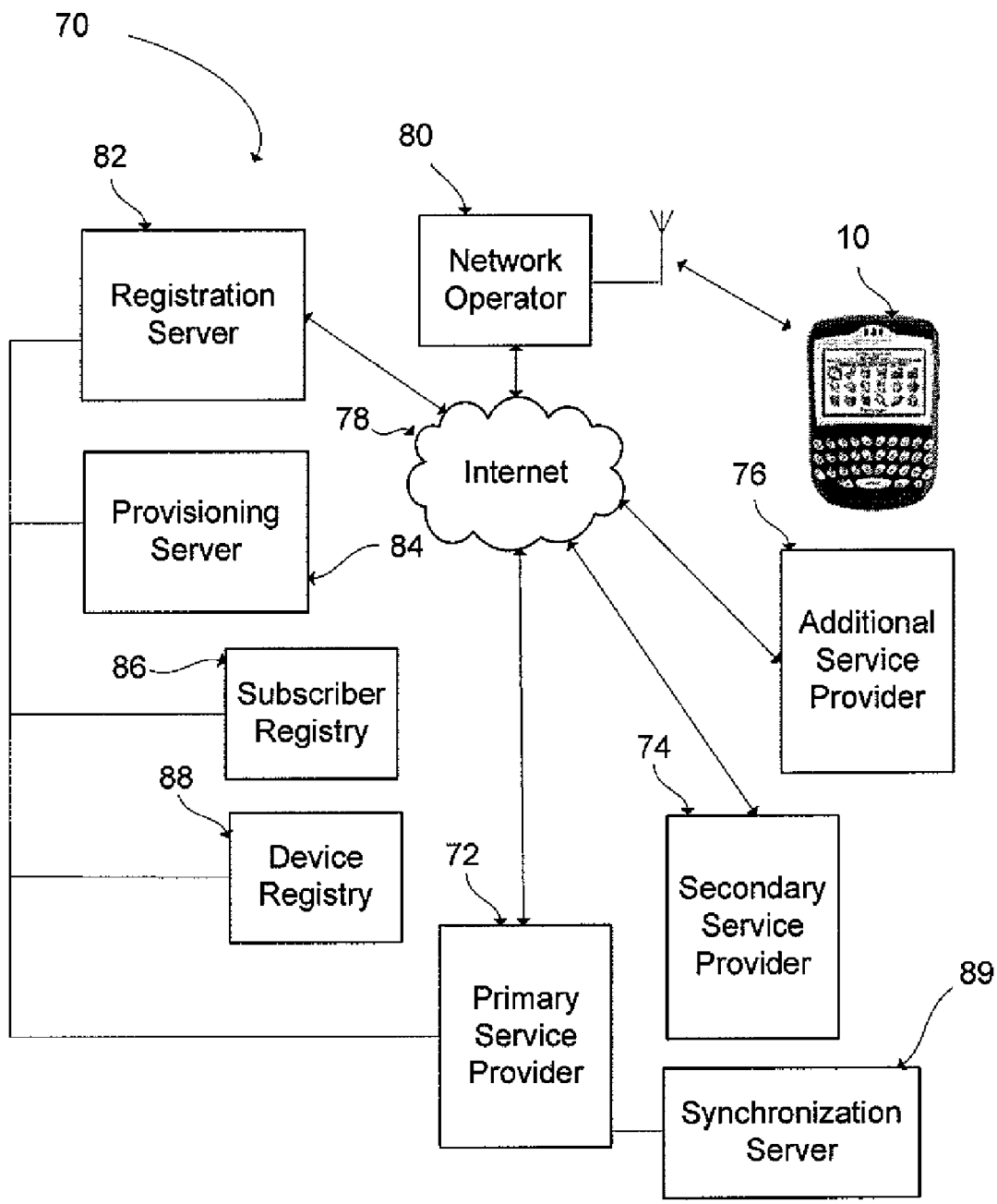
FIG. 3 is a block diagram of a communication system with which the electronic device of FIGS. 1 and 2 communicates.

Turning now to FIG. 3, a communication system is shown over which the electronic device 10 communicates. More particularly, a system 70 is shown for provisioning a plurality of services to the electronic device 10. Thus, for example, a first e-mail account (e.g. Rogers™ e-mail) may be provided by a primary service provider 72, and a second e-mail account (e.g. Yahoo!™ email account) may be provided by a secondary service provider 74. Additional service providers, such as service provider 76, may provide further services. System 70 and service providers 72, 74, 76, etc., communicate over Internet 78, in a well-known manner. Electronic device 10 also communicates over Internet 78 via wireless services provided by a network operator 80.

The system 70 includes a registration server 82, a provisioning server 84, a subscriber registry 86 and a device registry 88. The system 70 is shown operating under control of the primary service provider 72, although the system 70 may operate under control of the secondary service provider 74, the additional service provider 76, or independently of any service provider.

The system 70 may also include a synchronization server 89 for performing data synchronization with the electronic device, as discussed in greater detail below with reference to FIGS. 4 and 5.

It is conventional for the primary service provider 72 to store an IP address of the registration server 82 within electronic device 10, at the time the device is delivered to the user. Upon initially activating the electronic device 10, the device detects the presence of the wireless network controlled by network operator 80 and uses the stored address of the registration server 82 to send a registration request to the registration server. The registration request includes an identification code for the device 10, the identity of the user, and the identity of the network operator 80.

Upon receipt of the registration request, server 82 attempts to authenticate the request and, if successful, extracts the information in the request message and transmits it to the provisioning server 84. Provisioning server 84 determines whether the user is permitted to provision the associated service by checking the status of the user in subscriber registry 86. Similarly, provisioning server 84 checks the status of the device in device registry 88. If provisioning server 84 is unable to approve the registration request based on the status of the user or the device as maintained in the subscriber registry 86 and/or the device registry 88 then provisioning server 84 typically either disallows or delays the registration request while the subscriber's status is checked in real-time with the network operator 80.

If the provisioning server 84 is able to approve the registration request then, the provisioning server 84 transmits (or "pushes") a service book (or multiple service books) to the device 10 that contains data and instructions to enable the device 10 to provision the associated service provided by service provider 72. The service book is configured to become active upon receipt at the device 10 to permit the user to enter a desired user ID and a desired password for the associated service.

The device 10 then transmits the user ID and password specified by the user for the associated service to provisioning server 84. Communication between the electronic device and the provisioning server 84 may be protected using encryption or other techniques, such as transport layer security (TLS). The provisioning server 84 determines if an account for the associated service may be created using the user ID and password specified by the user. If the account may be created, then provisioning server 84 creates the associated service account for device 10 in the associated server provider system 72 and downloads a corresponding service book to the electronic device 10. The corresponding service book contains service records such as a Compressed Multipurpose Internet Mail Extensions (CMIME) service record, for example.

If the user wishes to associate additional services, provisioning server 84 permits the user to specify details relating to each additional service. For example, the user may enter the e-mail address, username and password for the additional service (which may be provided by secondary service provider 74 or additional service provider 76). This information is transmitted to the provisioning server 84 which then attempts to contact the additional service provider system (e.g. secondary service provider 74 or additional service provider 76) to associate the additional service with the primary service provided by the primary service provider 72.

If the provisioning server 84 is able to configure the additional service to operate with the primary service, it pushes a new service book to the electronic device 10 that is similar to the initial service book, except that it is preferably not configured to become active automatically when received at the device 10. The new service book may be executed on electronic device 10 at the request of the user and may be used to associate additional services with the primary service. As indicated above, upon creation of the additional service account for device 10 in the associated server provider system 72, the provisioning server 84 downloads a further service book to the electronic device 10.

Figure 4:
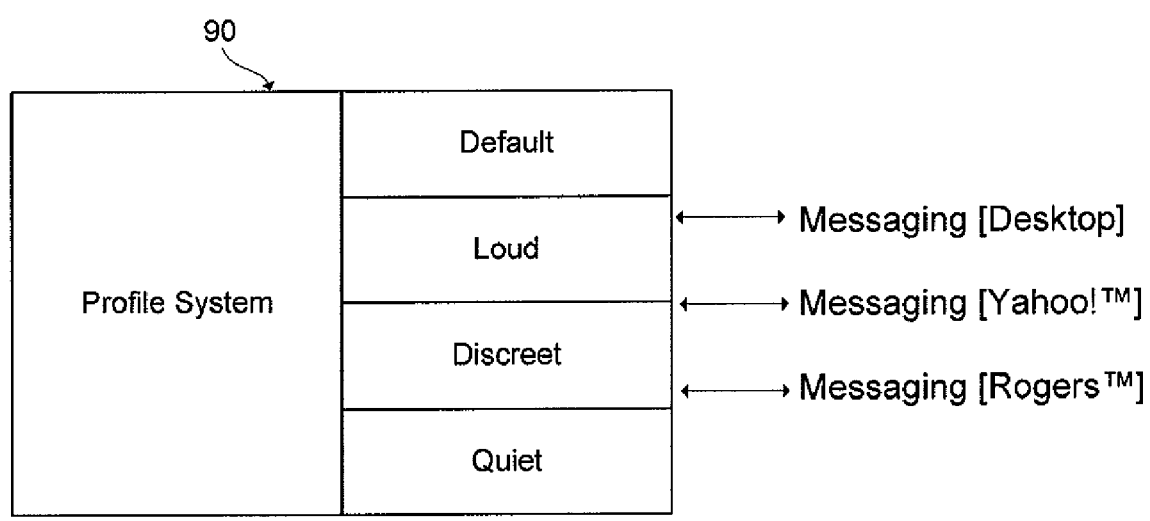
FIG. 4 is a block diagram of a profile system forming part of the electronic device of FIGS. 1 and 2, according to an exemplary embodiment.

According to an exemplary embodiment, as shown in FIG. 4, a profile system 90 is provided having multiple programmable profile settings (e.g. Loud, Discreet, Quiet, and, although not shown, optionally also vibrate, LED flash, etc.), and a default profile setting that is initially assigned to each application (e.g. calendar, messaging, tasks, alarm, etc.). In response to receipt of service records for multiple services associated with an application (e.g. multiple e-mail accounts associated with the messaging application), the multiple services register with the profile system using a unique ID for each service record. Thus, for the exemplary embodiment of FIG. 4, each of the multiple messaging services (i.e. Messaging [Desktop], Messaging [Yahoo!™], Messaging [Rogers™], etc.) registers with the profile system 90. As part of the registration process, each of the multiple services transmits data to the profile system 90 for identifying the default profile setting for the associated application (i.e. Messaging).

In response, profile system 90 initially assigns the default profile setting to each of the multiple services pending receipt of profile setting data whereupon individual programmable profile settings are assigned to respective ones of the multiple services.

Figure 5:
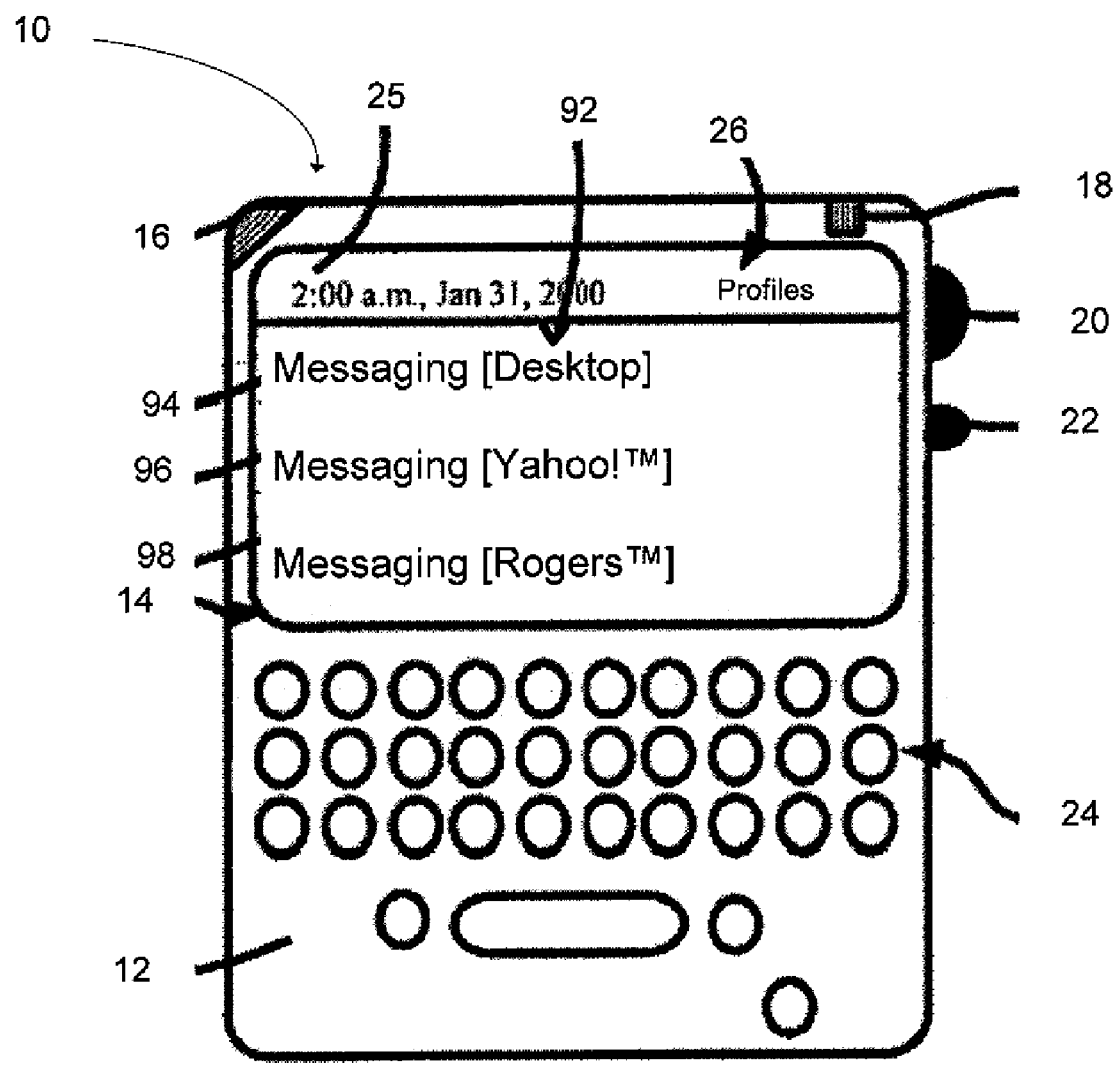
FIG. 5 is a schematic representation of the electronic device with a graphical user interface for programming profile settings for different services, according to an exemplary embodiment.

As shown in FIG. 5, a user interface 92 is provided for entering profile setting data. By highlighting and then clicking any of the services (Messaging [Desktop] 94, Messaging [Yahoo!™] 96, Messaging [Rogers™] 98, etc.) using trackwheel 20, the list of notification profiles Quiet 28, Discreet 30, and Loud 32 are displayed, as shown in FIG. 1. The user may then enter profile setting data by selecting one of the profiles (e.g. "Discreet) using the trackwheel 20.

In some cases, such as during a system restore or after a software version upgrade, the user's programmed profiles will be reset. However, the profile setting data for the programmed profiles will have been stored on synchronization server 89 as a result of a previous routine data synchronization between the electronic device 10 and the synchronization server 89. Hence, when the device 10 and server 89 perform the next data synchronization the profile setting data may be downloaded to the electronic device 10 before the user's multiple services (e.g. e-mail accounts) have been provisioned. Consequently, the profile system 90 has no services against which to apply the profile setting data.

In this case, the profile setting data is stored in the profile system 90 but marked as hidden files. If no service records for the services in connection with which hidden profile settings have been stored are received by the device 10 within a predetermined period of time (e.g. 7 days), the hidden files are discarded during a subsequent synchronization process.

Figure 6:
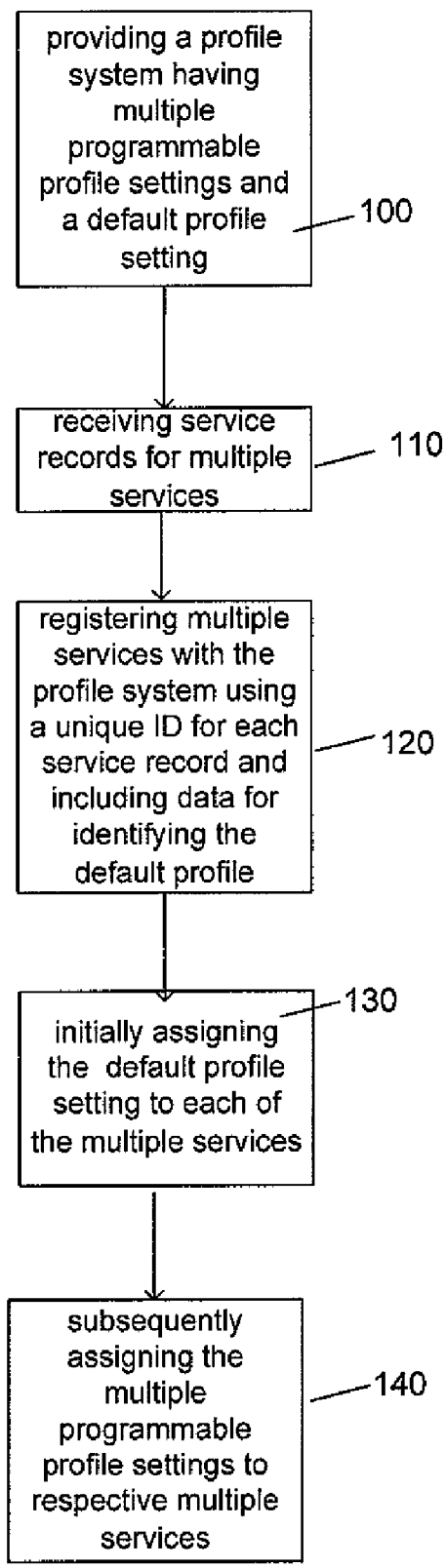
FIG. 6 is a flowchart showing a method for configuring unique profile settings for multiple services according to an exemplary embodiment.

Turning to FIG. 6, a flowchart is provided showing a method for configuring unique profile settings for multiple services according to an exemplary embodiment. In step 100, profile system 90 is provided having multiple programmable profile settings and a default profile setting for the application (e.g. messaging). In step 110, service records are received for the multiple services from provisioning server 84. In step 120, the multiple services register with the profile system 90 using a unique ID for each service record and including data for identifying the default profile setting for the application. In step 130, the default profile setting is initially assigned to each of the multiple services. Then, at step 140, the multiple programmable profile settings are subsequently assigned to respective ones of the multiple services.

Figure 7:
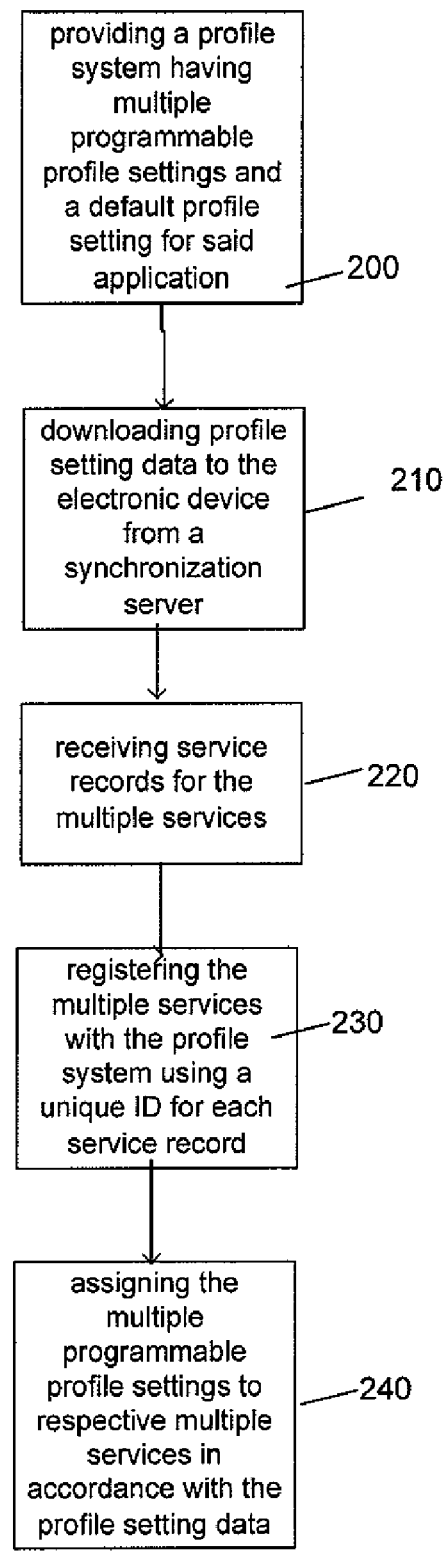
FIG. 7 is a flowchart showing a method for configuring unique profile settings for multiple services according to a further embodiment.

Turning to FIG. 7, a flowchart is provided showing a method for configuring unique profile settings for multiple services according to a further embodiment. In step 200, profile system 90 is provided having multiple programmable profile settings. In step 210, profile setting data is downloaded to the electronic device 10 from synchronization server 89. In step 220, service records are received for the multiple services from provisioning server 84. In step 230, the multiple services register with the profile system 90 using a unique ID for each service record. In step 240, the multiple services register with the profile system 90 using a unique ID for each service record. Then, at step 250, the multiple programmable profile settings are assigned to respective ones of the multiple services.

Figure 8:
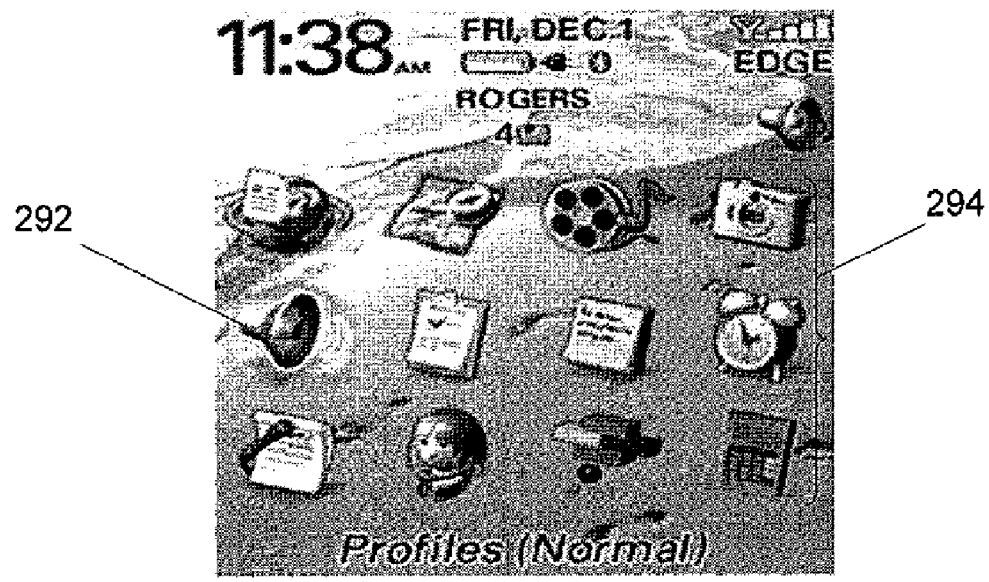
Figure 9:
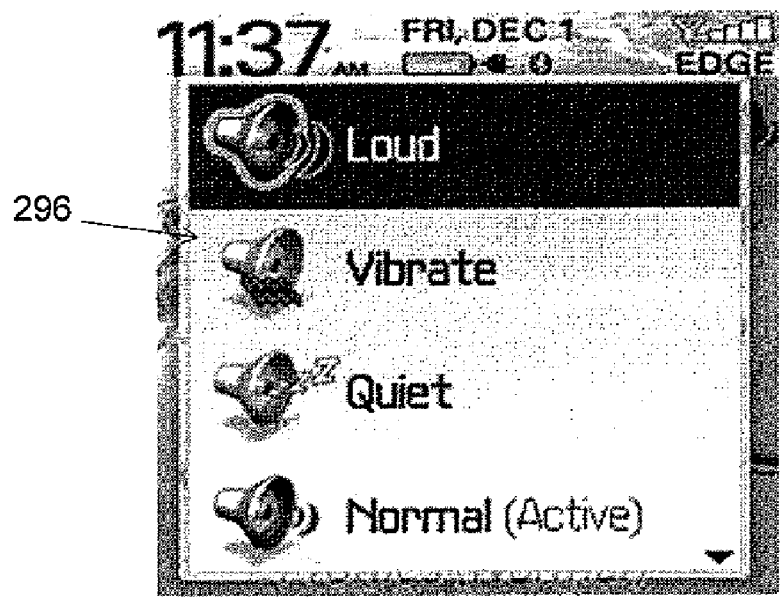
Figure 10:
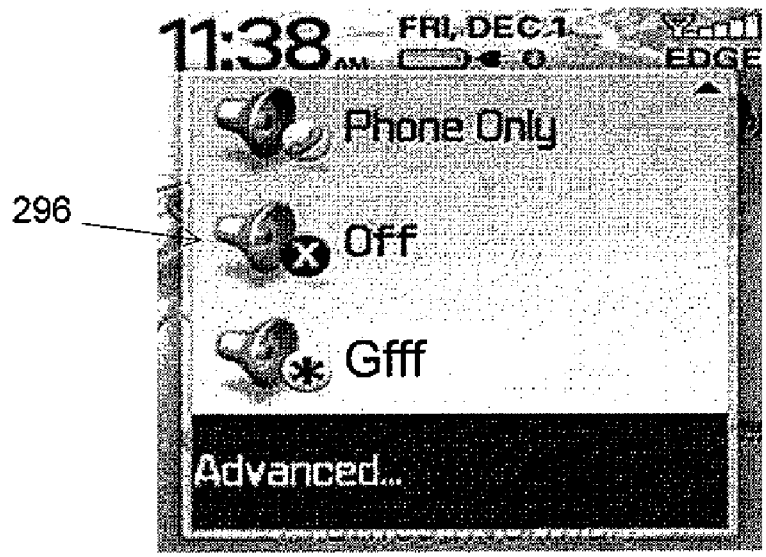

Referring to FIG. 8, another exemplary embodiment is shown. According to this embodiment, a profiles application is accessed by highlighting and clicking a profiles icon 292 from a menu 294. By highlighting the profiles icon 292 prior to clicking, the active profile may be viewed at the lower portion of the LCD display 14. As indicated, the active profile is "Normal". Selection of the profiles icon 292 launches a profiles submenu 296, which includes a list of selectable profiles, as shown in FIGS. 9 and 10. The list includes both pre-set profiles and user-created profiles, such as "Gfff". From the profiles submenu 296, the user may select and apply an alternate profile or edit the parameters of the current profile by selecting "Advanced . . . ".

Figure 11:
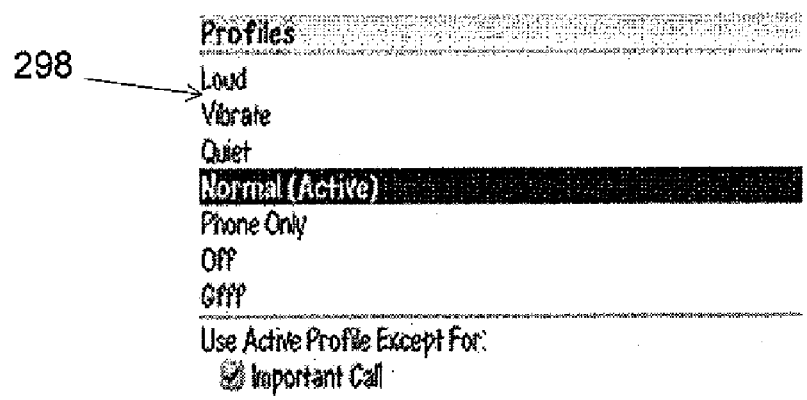

Selection of the advanced option launches another profiles submenu 298, which is shown in FIG. 11. In order to edit the settings in the current profile, the user highlights and clicks the profile to launch an application profile selection submenu 300, which is shown in FIG. 12. The application profile selection submenu 300 includes a list of applications for which profile settings may be programmed (e.g. calendar, messaging, tasks, phone, etc). As shown, the list of application profiles includes multiple messaging profiles: Messages[Desktop] 302, Messages[Email] 304 and Messages[Web Client] 306. Each of these messaging profiles corresponds to a different email account.

The Messages[Desktop] profile 302 corresponds to an email account that is hosted on a company server. The Messages[Email] and Messages[Web Client] profiles 304 and 306, respectively, correspond to email accounts that are hosted by primary 72, secondary 74 or other service providers 76. Some examples of service providers 72, 74, 76 include Yahoo!™, Rogers™, Hotmail™ and Google™.

In some cases, the bracketed text identifying the message profile 304, 306 is replaced by the name of the service provider. For example, in the application selection submenu 300, the messaging application corresponding to a Yahoo!™ email account will appear as Messages[Yahoo!™], as shown in FIG. 5. The name that is provisioned to the email account (eg. Yahoo!™) is determined by the contents of the provisioned CMIME service record that is forwarded to the electronic device 10 when the email account is set up. The device 10 retrieves the name from the CMIME record for display. The name is determined by the service provider at the time the CMIME record is sent to the device 10.

In order to change the profile settings for any of the messaging applications, the user highlights and clicks the message profile 302, 304, 306 and a screen including profile options is launched. As shown in FIG. 13, the profile options for Messages[Desktop] 304 specifies how the electronic device 10 will behave in response to receipt of an email message from the email account associated with that profile. Since all devices fit into a protective cover or holster, separate settings are provided for devices 10 in the holster and devices 10 out of the holster. For users who do not use a holster, the out of the holster settings apply at all times.

The profile options include tune, volume, number of beeps, repeat notifications and number of vibrations. It is also possible to specify whether or not you wish to be notified of the arrival a new email message during a phone call. According to the profile of FIG. 13, when in the holster, the device will vibrate a single time and the LED indicator 18 will flash upon receipt of a new email message from the account associated with the Messages[Desktop] profile 304. As indicated, no notification will be provided when the device is out of the holster.

The CMIME records associated with each email address further optionally include a default profile. If no default profile is provided, a device default profile is adopted.

In order to navigate through the various menus and make selections, a selection device such as a trackball, which allows movement along two axes and also acts as an input key when depressed, may be used. It will be appreciated by a person skilled in the art that the trackball may be used in any of the exemplary embodiments described herein. Alternately, trackwheel 20, which is shown in FIG. 1, or another suitable selection device may be used.

While the embodiment described herein is directed to a particular implementation for configuring unique profile settings for multiple services, it will be understood that the steps described hereinabove are not limited to the order in which they are described. The steps described can be performed in any suitable order as may occur to those skilled in the art.

Many other modifications and variations may occur to those skilled in the art. All such modifications and variations are believed to be within the sphere and scope of the present application.

What is claimed is:

1. A method for configuring a unique profile for a service associated with an application in an electronic device, comprising:
   providing a profile system having multiple programmable profile settings and a default profile setting for said application;
   receiving a service record for said service, said service record comprising a unique ID for said service record;
   registering said service with said profile system using said unique ID;
   configuring said multiple programmable profile settings using profile setting data to provide said unique profile, wherein said profile setting data is retrieved from said service record; and
   identifying said unique profile using said unique ID;
   wherein if said service record does not include profile setting data, said default profile setting is used for said service.

2. The method of claim 1, wherein said unique ID identifies said unique profile in a user-selectable menu.

3. The method of claim 2, wherein selection of said unique ID launches an editable profile settings screen.

4. The method of claim 3, wherein said data of said unique profile is editable via a user interface.

5. The method of claim 1, wherein one of said multiple programmable profile settings are assigned to said service as a result of downloading profile setting data during synchronization between said electronic device and a synchronization server.

6. An apparatus for configuring unique profile settings for multiple services associated with an application in an electronic device, comprising:
   a profile system having multiple programmable profile settings and a default profile setting for said application;
   means for receiving service records for said multiple services;
   means for registering said multiple services with said profile system using a unique ID for each of said service records; and
   means for assigning unique profiles to each of said multiple services using data from said service records.

7. The apparatus of claim 6, further comprising a user interface for assigning said multiple programmable profile settings to respective ones of said multiple services.

8. The apparatus of claim 7, wherein each of said multiple programmable profile settings is editable via said user interface.

9. The apparatus of claim 6, further comprising a synchronization server for downloading profile setting data to said electronic device whereupon said multiple programmable profile settings are assigned to said respective ones of said multiple services.

10. A portable electronic device comprising:
    an antenna and radio device for receiving service records for multiple services associated with an application of said portable electronic device, at least one of said service records including unique profile setting data and a unique ID corresponding to said unique profile setting data;

a profiles system in communication with said application, said profile system including multiple programmable profile settings and a default profile setting corresponding to said application;

a processor for programming at least one of said multiple programmable profile settings based on said unique ID and unique profile setting data from said at least one service record and assigning said at least one of said multiple programmable profile settings to a corresponding one of said multiple services, said default profile setting being assigned to others of said multiple services; and a display screen for displaying a list of said multiple services, said corresponding one of said multiple services being identified by said unique ID.

11. A portable electronic device as claimed in claim 10, wherein said application is an email application.

12. A portable electronic device as claimed in claim 10, further comprising a user interface including said display screen for assigning said multiple programmable profile settings to respective ones of said multiple services.

13. A portable electronic device as claimed in claim 12, wherein said multiple programmable profile settings are editable via said user interface.

* * * * *